United States Patent [19]
Heyda et al.

[11] Patent Number: 5,165,543
[45] Date of Patent: Nov. 24, 1992

[54] PROTECTED OPTICAL FIBER PACKAGE

[75] Inventors: Robert J. Heyda, Doraville; Rama Iyengar, Lilburn; Clyde J. Lever, Jr., Buford; John M. Paxton, Powder Springs, all of Ga.

[73] Assignee: AT&T Bell Laboratories, Murray Hill, N.J.

[21] Appl. No.: 765,639

[22] Filed: Sep. 25, 1991

[51] Int. Cl.⁵ .............................. B65D 85/66
[52] U.S. Cl. ........................ 206/400; 206/410
[58] Field of Search .......... 206/398, 399, 400, 410

[56] References Cited

U.S. PATENT DOCUMENTS

| | | | |
|---|---|---|---|
| 1,873,618 | 8/1932 | Miller | 206/400 |
| 2,515,669 | 7/1950 | Scholl | 206/398 |
| 2,552,594 | 6/1951 | Scott, Jr. | |
| 2,568,263 | 11/1953 | Scott, Jr. | |
| 4,696,438 | 9/1987 | Myers | 242/118.41 |

Primary Examiner—William I. Price
Attorney, Agent, or Firm—E. W. Somers

[57] ABSTRACT

A protected package (20) of optical fiber includes a spool which includes a hub (22) and two spaced flanges (24,26). Optical fiber (23) is wound on the hub with an end of the fiber being accessible to allow the fiber to be tested. A strip (52) of plastic material is wrapped about the spool with longitudinal edge portions (54,54) of the strip overhanging the flanges to provide a cover (50). The protected package permits withdrawal of the fiber through a gap (64) between the cover and the flanges. Further, in a preferred embodiment, each longitudinal edge portion is provided with openings (60,60). The openings are spaced apart such that when a strip is wrapped about any of expected size spools, at least one pair of the openings will become aligned to allow insertion of fastening means (62) which function to hold the strip assembled to the spool to protect the fiber and to prevent unintended removal of the cover.

9 Claims, 2 Drawing Sheets

PROTECTED OPTICAL FIBER PACKAGE

TECHNICAL FIELD

This invention relates to a protected optical fiber package. More particularly, this invention relates to a package of optical fiber in which convolutions of optical fiber which are wound on a spool are protected from contamination and mechanical damage.

BACKGROUND OF THE INVENTION

Optical fiber has become a widely accepted form of transmission media. A continuous length of the fiber is drawn from an optical preform which may be made by any one of several known processes. Afterwards, or as part of a tandem process, the drawn fiber is coated, cured, measured and taken up, desirably in an automatic takeup apparatus, and packaged on a spool.

The package has several uses. It is used to take up, to store the optical fiber, and to pay out the fiber for other operations such as ribboning, cabling, rewinding. Also, it is used to ship optical fiber which is wound thereon to other companies which further process the fiber.

A spool which is used in the takeup of optical fiber as well as for further processing and for shipping must also have at least one additional feature. Both ends of the optical fiber which is wound on the spool must be accessible for measurement and characterization purposes. It should be apparent that the last portion of the length of optical fiber which is wound on the spool is readily accessible. However, provisions must be made for accessing the initial portion of the length of the optical fiber which is wound on the spool. Also, following the measurement, it still may be desirable to have both ends accessible for further processing.

The spool includes a barrel or hub having a longitudinal axis and a cross sectional configuration which is normal to the longitudinal axis and which has a generally circular configuration. Generally, the hub has been covered with a foamlike material which acts as a cushion and stabilizes the convolutions of the optical fiber. First and second flanges are attached to opposite ends of the hub. Each flange may have a truncated conical shape with a large diameter portion thereof facing outwardly and a small diameter portion being attached to the hub.

In one commercially used spool, the first flange includes a slot which is formed radially of the flange. Also, a collector is attached to the first flange to collect a few convolutions of the optical fiber and to provide access to one end portion of the length of optical fiber which is wound on the spool. The collector includes a disc-like flange and a cylindrical surface on which are wound convolutions of optical fiber.

The slot in the first flange allows a portion of the optical fiber to extend therethrough to connect the optical fiber on the collector to the optical fiber on the hub. Advantageously, the slot in the first flange is sufficiently wide so that micro- or macro-bending of the portion of the length of the optical fiber which extends therethrough is inhibited substantially. Also, the first flange has a substantially uniform thickness with a large diameter portion thereof overhanging the collector groove which is defined by the cylindrical surface, the disc-like flange and the first flange. This further helps to minimize the curvature of the portion of the length of optical fiber which extends through the slot in the first flange to inhibit any micro-or macro-bending losses.

It has been common practice in the industry to use a molded spool having disc-like flanges connected through a cylindrical hub and being molded from an ABS or polyethylene material, for example. Typically, a spool may include a hub having a 10.2 cm traverse and a diameter of about 15.2 cm whereas the flange has a diameter of about 20.3 cm.

As mentioned hereinbefore, it is not uncommon for the optical fiber package to be inventoried and/or used in manufacturing operations or to be shipped to the field or to a customer. During that time the optical fiber of the package is exposed to contaminants in the ambient atmosphere and to mechanical damage. Such contaminants include particles of dust.

Dust particles may have a degrading effect on the optical fiber of the package. For example, the particles of dust may become embedded in a coating material which has been applied to an outer surface of the drawn glass. These may migrate to the glass-coating material interface and result in a physical break in the fiber.

Further, the drawn, coated optical fiber may be coated subsequently with a colorant system. Typically, the drawn, coated fiber is moved along a manufacturing line wherein a colorant system is applied. Should particles of dust be present on the drawn coated fiber, apparatus of the manufacturing line may become contaminated. Clearly, there is a need to provide protection for the optical fiber on a spool from such contaminants.

Of course, an obvious disadvantage to an unprotected package of optical fiber is the possibility of physical damage to the fiber. Exposure during handling either for shipment or further processing such as cabling or the application of a colorant system could result in inadvertent contact with the fiber and possible damage thereto.

Also, should the spool of wound optical fiber be covered, it must be done in such a way that portions thereof adjacent to the last wound end be able to be removed for testing. In the prior art, there appears to be no widely accepted protection for optical fiber of a package in which optical fiber may be pulled from the spool without removing the cover. Material such as SARAN ® plastic wrapping material, for example, has been used, but it touches the fiber and does not provide mechanical protection for the optical fiber. Because this kind of wrapping contacts the fiber, portions of the fiber cannot be pulled out with the wrapping still in place.

What is needed and what does not appear to be available in the prior art is a protected optical fiber package. What is sought after is a package which includes an easily applied protective measure, the protective measure being relatively inexpensive and one which is easily removed to expose the fiber. Also, the protective measure must protect the fiber from physical damage, as well as from contaminants. The fiber ends should be accessible even when the protective device is in place around the spool.

SUMMARY OF THE INVENTION

The foregoing problems of the prior art have been overcome by the protected optical fiber package of this invention. A protected optical fiber package comprises a spool which includes a hub and two spaced flanges, a plurality of convolutions of optical fiber which are wound on the hub, and a cover which is assembled to the spool and which covers the convolutions of optical fiber on the hub. The cover comprises a strip of relatively flexible material which has been wrapped about the spool such that longitudinal edge portions of the strip extend beyond the flanges, and securing means for holding the cover assembled to the spool.

In a preferred embodiment, the cover has a length and is wrapped about the spool to overlap end portions of the strip. Further, longitudinal edge portions are provided with spaced openings with at least two openings along each edge portion being aligned and having a fastener extending therethrough. Multiple fasteners along each edge are used to prevent the cover from being removed inadvertently. They prevent sliding off of the cover. Also, the length is such that the same strip of plastic can be used to cover different size spools of an expected range of spool sizes which are to be covered.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
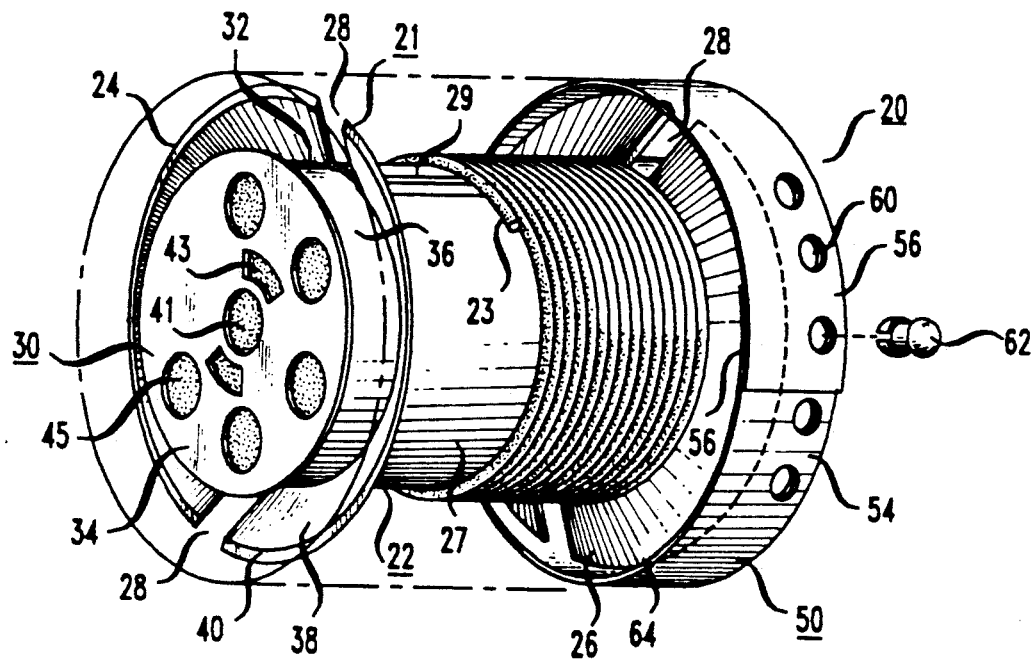
FIG. 1 is a perspective view of a protected optical fiber package with optical fiber included therein being exaggerated in diameter for purposes of clarity.
Figure 2:
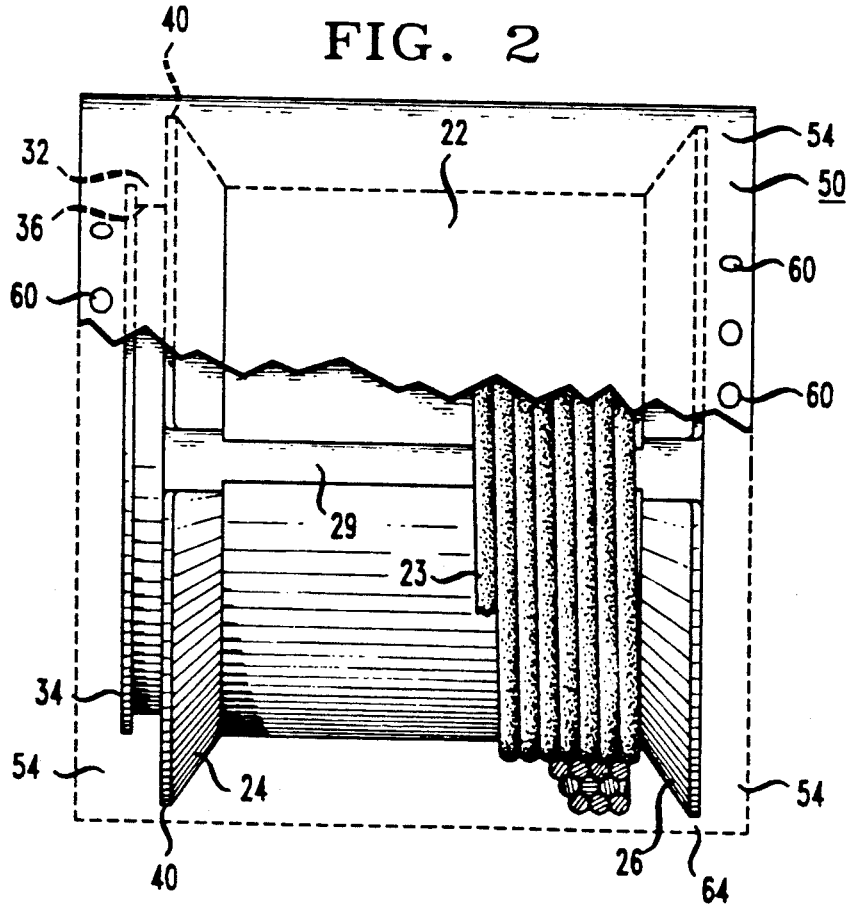
FIG. 2 is a front elevational view of a spool on which a plurality of layers of convolutions of optical fiber are wound with a protective cover disposed about the spool, the diameter of the optical fiber being exaggerated for purposes of clarity.

Referring now to FIGS. 1-2, there is shown a perspective view of a protected optical fiber package which is designated generally by the numeral 20. The package 20 includes a spool 21 which is adapted to hold a plurality of convolutions of optical fiber 23 which are wound thereon. The spool 21 may be used as a take-up spool in an automatic takeup apparatus. Also, it may be used to pay out optical fiber in a cabling line, to store optical fiber or as a means to ship optical fiber. The spool 21 may be made of a polyethylene or ABS material or a cellular styrene material.

As can be seen in FIGS. 1 and 2, the spool 21 of the preferred embodiment includes a hub 22 which is cylindrical in shape and two flanges designated 24 and 26 which are attached to the hub at opposite ends thereof. In one embodiment, the hub 22 is covered with a foam material 27 which cushions optical fiber which is wound in convolutions about the hub. In the one embodiment, the foam material is made of a polyurethane or polyethylene material and has a thickness of about 0.48 cm. Each of the flanges 24 and 26 has a truncated conical shape having an inner diameter which is about the same diameter as the diameter of the hub 22 and an outer diameter which is larger than the inner.

As can be seen best in FIG. 1, each of the flanges 24 and 26 includes diametrically opposed slots 28—28. The slots 28—28 are suitable for allowing portions of an optical fiber 23 to extend therethrough. Further, the slots 28—28 in one flange may be aligned with the slots in the other flange. In one embodiment, a slot 29 is provided in the foam material 27 which extends between and is aligned with two of the aligned slots in the flanges. This arrangement permits removal of start-up scrap convolutions of optical fiber 23 on the spool 21 by using a cutter blade (not shown) without damaging the spool.

The spool 21 also is provided with a collector device which is designated generally by the numeral 30. As is seen in FIGS. 1 and 2, the collector device 30 includes a groove 32 which is defined by a flange 34, a cylindrical surface 36 and an outer surface 38 of the flange 24. The grooves 28—28 of the flange 24 facilitate communication between the groove 32 of the collector device and the hub 22 of the spool. As can be seen in FIG. 2, an outer diameter peripheral edge 40 of the flange 24 overhangs a portion of the cylindrical surface 36 of the collector device.

In the preferred embodiment, each of the flanges 24 and 26 has an outer diameter of 20.8 cm. and an inner diameter of about 15.2 cm. The length of the hub is about 14.5 cm, the overall length of the spool 21 is 18.3 cm and the overall distance from the outside of the flange 24 to the outside of flange 26 is about 17.5 cm. The diameter of the flange 34 of the collector spool is about 16.8 cm and its thickness is about 0.24 cm.

Each of the flanges 24 and 26 is provided with a central opening 41, two arcuately shaped openings 43—43 and a plurality of other openings 45—45. (see FIG. 1). The central opening is adapted to receive an arbor of a winding or payout apparatus (not shown) whereas the openings 43—43 and 45—45 are adapted to receive driving dogs of takeup or payout apparatus or fingers of operators wishing to reposition or transport the spools.

Further description of the spool 21 is provided in U.S. Pat. No. 4,696,438 which issued on Sep. 29, 1987 in the name of Daryl L. Myers and which is incorporated by reference hereinto.

The package 20 of this invention also includes a protective cover which is designated generally by the numeral 50 and which may be seen in FIGS. 1 and 2. The protective cover 50 is such that it provides protection for the optical fiber which is wound on the spool from contaminants and from physical damage.

In the preferred embodiment which is shown in FIG. 1, the protective means 50 includes a strip 52 (see FIG. 3) comprising a relatively flexible plastic material such as, for example, a strip of polyvinyl chloride (PVC). The thickness of the strip 52 and the material are such that the strip is flexible and may be easily wrapped about the spool. Also, it is desirable that the plastic material of the strip 52 be transparent so that the optical fiber wound on the spool may be observed. A strip of clear PVC having a thickness of 0.05 cm has been found to be suitable.

Further, the width of the strip 52 is such that when a length of the strip is wrapped about the spool, longitudinal edge portions 54—54 thereof overhang the flanges of the spool. In a preferred embodiment, each longitudinal edge portion overhangs its associated flange by about 0.64 cm. This configuration is used in order that the securement of overlapping end portions of the strip may be effected. As can be seen in FIGS. 1 and 2, the length of the strip which is used for the spool is such that end portions 56—56 of the strip become overlapped when the length is wrapped about the spool. The protective material may be supplied in a roll and portions thereof cut from the roll as required for various diameter spools.

Figure 4:
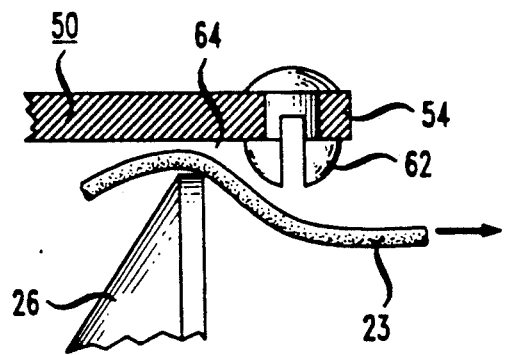
FIG. 4 is a detail view of a longitudinal edge portion of the protective cover disposed about the spool with a fastener being disposed in an opening in the longitudinal edge portion of the cover.

The protective arrangement also must include means for securing the cover to the spool to maintain protection while the spool is being handled or shipped. In the preferred embodiment, the strip 52 is formed such that each longitudinal edge portion is provided with openings 60—60 therealong. The openings 60—60 are spaced apart such that when a predetermined length of the material is wrapped about a spool of one of an expected range of sizes, end portions thereof become overlapped, and at least one pair of two openings along each longitudinal edge portion 54 become aligned. This allows a production technician to introduce an insert such as an expandable plastic fastener 62 (see also FIG. 4), for example, into the aligned openings whereupon portions of the fastener may expand to hold the fastener in the strip and secure the strip to the spool. In the preferred embodiment, the length of the strip is 76.2 cm and its width is 20.3 cm. This predetermined length and width strip is suitable for covering any expected size spool in use in a particular manufacturing facility. Also, the length of the strip is such that the end portions of the strip overlap in a range of between 2.5 cm for the largest expected size spool to be covered to about 8.8 cm for the smallest.

Figure 3:
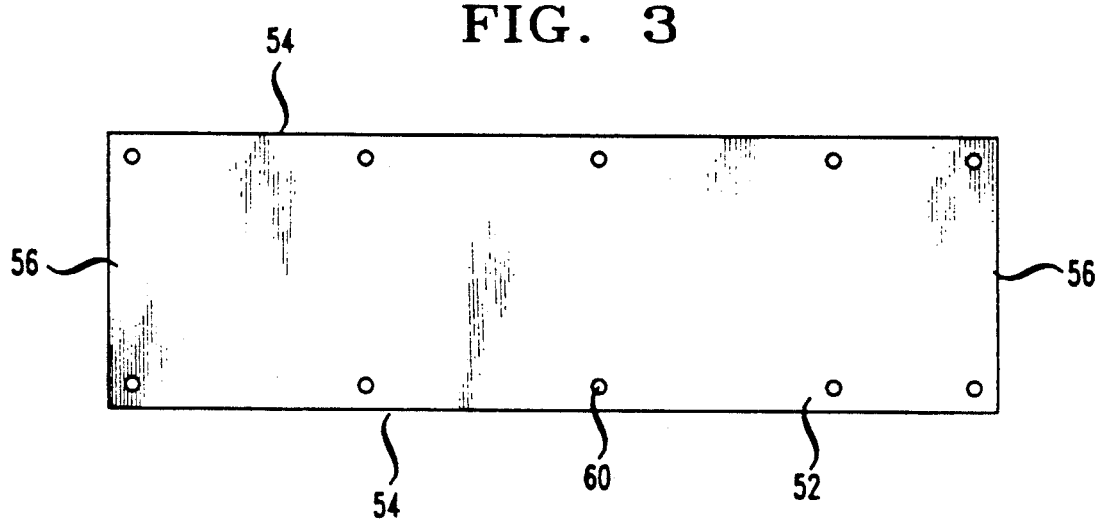
FIG. 3 is a plan view of a length of flexible protective material which may be wrapped about a spool of optical fiber.

In the preferred embodiment, the openings 60—60 are provided in specific locations along the longitudinal edge portions of the strip 52 (see FIG. 3). The locations are predetermined so that when the strip is wrapped about array of expected size spools, openings are spaced about the periphery of the flanges. Inserts positioned in openings spaced about the flange (see FIG. 4) as well as those in the overlapped portions of the strip prevent the wrapped strip from sliding off the spool.

Also, the cover 50 and its position on the spool is such that optical fiber may be pulled from the spool for testing, for example. This is accomplished by causing the length of the strip 52 to be such that when the strip is wrapped about the spool, and if it were disposed concentrically with respect to the flanges, a gap 64 (see FIGS. 1 and 4) is provided between an outer peripheral surface of the spool flanges and the strip. The gap 64 is sufficient to allow optical fiber to be withdrawn without damage to the fiber. For concentric disposition of the cover, a preferred size gap is about 500 µm. Also, the fasteners 62—62 are rounded along a portion thereof which is directed inwardly toward the longitudinal axis of the spool and is sufficiently short so as not to impede payout. Of course, in use, the cover will engage portions of the flanges, thereby increasing the gap on diametrically opposed portions thereof. Notwithstanding the non-concentric disposition of the cover about the flanges, the length of each insert is such that the distance from an underside of the strip 52 to the inner end of the insert is greater than the increased gap size caused by the non-concentric disposition. The length of each insert is such that an inner portion thereof will not clear the outer periphery of the flange, thereby functioning as a stop to prevent lateral movement of the cover.

Whereas the preferred embodiment of the fastening arrangement for the strip has been described hereinbefore, other arrangements may be used. For example, longitudinal edge portions may be provided with well known VELCRO® fastening arrangements (not shown) or side clips (not shown) may be used.

Advantageously, the protective arrangement of the package 20 of this invention does not include fastening means which contacts the fiber between the flanges. Further, the cover 50 does not interfere with access to the ends of the fiber for testing purposes.

It is to be understood that the above-described arrangements are simply illustrative of the invention. Other arrangements may be devised by those skilled in the art which will embody the principles of the invention and fall within the spirit and scope thereof.

We claim:

1. A protected optical fiber package, which comprises:

a spool which includes a hub and two spaced flanges;

a plurality of convolutions of optical fiber which are wound on said hub; and a cover which covers said convolutions of optical fiber on said hub, said cover comprising a strip of flexible material which is maintained out of engagement with said optical fiber and which has been wrapped about said spool such that longitudinal edge portions of the strip extend beyond said flanges wherein said cover is such that a gap is provided between said cover and each said flange, said gap being sufficient to allow the withdrawal of optical fiber from said spool; and securing means for holding said cover assembled to said spool.

2. The protected optical fiber package of claim 1, wherein the length of the strip which is wrapped about said spool is such that end portions of said strip are overlapped.

3. The protected optical fiber package of claim 2, wherein said strip includes a plurality of spaced openings adjacent to each longitudinal edge of said strip.

4. The protected optical fiber package of claim 3, wherein the diameter of said flanges of spools expected to be provided with said cover and the spacing of said openings along the longitudinal edge portion of said strip are such that when said length of said strip is wrapped about said spool, at least one pair of aligned openings are provided in overlapped portions thereof.

5. The protected optical fiber package of claim 4, wherein said securing means includes fasteners with one said fastener being received in each pair of aligned openings.

6. The protected optical fiber package of claim 2, wherein longitudinal edge portions of overlapped portions of the strip are provided with interlocking flexible elements which interlock with each other when said portions are overlapped to secure together said overlapped portions.

7. The protected optical fiber package of claim 1, wherein said cover is formed from a strip of material which has a length in relation to the length of the periphery of each flange and which has a plurality of spaced openings along each longitudinal edge of said strip such that said strip may be used to provide a cover having overlapped end portions for any of expected size spools and such that at least one pair of aligned openings is provided in the overlapped end portions.

8. The protected optical fiber package of claim 1, wherein said cover includes a plurality of means spaced about each peripheral edge thereof to maintain said cover disposed about said spool.

9. The protected optical fiber package of claim 8, wherein said means includes a plurality of fasteners, each extending through one of said openings in said strip, the length of each fastener being such that each fastener extends beyond any gap between a flange and said cover and engages a flange should inadvertent relative sliding movement between said cover and said spool occur.

* * * * *